United States Patent
Grüss et al.

(10) Patent No.: US 11,173,529 B2
(45) Date of Patent: Nov. 16, 2021

(54) IN-LINE CALIBRATION OF THE ROLL GAP OF A ROLL STAND

(71) Applicant: Primetals Technologies Austria GmbH, Linz (AT)

(72) Inventors: Ansgar Grüss, Erlangen (DE); Bernd Linzer, Leombach (AT)

(73) Assignee: PRIMETALS TECHNOLOGIES AUSTRIA GMBH

( * ) Notice: Subject to any disclaimer, the term of this patent is extended or adjusted under 35 U.S.C. 154(b) by 187 days.

(21) Appl. No.: 16/078,650

(22) PCT Filed: Jan. 26, 2017

(86) PCT No.: PCT/EP2017/051647
§ 371 (c)(1),
(2) Date: Aug. 22, 2018

(87) PCT Pub. No.: WO2017/144226
PCT Pub. Date: Aug. 31, 2017

(65) Prior Publication Data
US 2019/0047029 A1  Feb. 14, 2019

(30) Foreign Application Priority Data
Feb. 22, 2016 (EP) .................... 16156732

(51) Int. Cl.
*B21B 38/10* (2006.01)
*B21B 37/58* (2006.01)
(Continued)

(52) U.S. Cl.
CPC ............ *B21B 38/105* (2013.01); *B21B 37/58* (2013.01); *B21B 38/04* (2013.01); *B21B 39/084* (2013.01);
(Continued)

(58) Field of Classification Search
CPC ....... B21B 37/58; B21B 38/105; B21B 38/10; B21B 38/04; B21B 37/62; B21B 37/165
See application file for complete search history.

(56) References Cited

U.S. PATENT DOCUMENTS 3,387,470 A   6/1968  Smith
3,702,071 A   11/1972 Masar .............................. 72/8
(Continued)

FOREIGN PATENT DOCUMENTS

CN   1253863 A   5/2000
CN   1277568 A   12/2000
(Continued)

OTHER PUBLICATIONS

International Search Report dated Apr. 18, 2017 in corresponding PCT International Application No. PCT/EP2017/051647.
(Continued)

*Primary Examiner* — Debra M Sullivan
(74) *Attorney, Agent, or Firm* — Ostrolenk Faber LLP

(57) ABSTRACT

In a normal operation of a roll stand (e.g. 4) of a roll train, working rolls (10) of the roll stand (4) are adjusted to a roll gap (s4) by adjusting a control element position (p4) of a control element (14) of the roll stand (4), such that the working rolls (10) roll the metal band (5). To determine the control element position (p4) to be adjusted, a calibration value (sC4) of the respective roll stand (4), further status parameters (P4) of the roll stand (4) and a target roll gap (s4*) are specified to a model (15) of the roll stand (4). The model (15) determines the control element position (p4) to be adjusted therefrom. In the calibration operation, a control element position (p4) is initially adjusted such that the metal band (5) passes through the roll stand (4) without being rolled. The control element position (p4) is varied such that the working rolls (10) roll the metal band (5). A thickness (d) of the metal band (5) is detected by a downstream thickness-
(Continued)

measuring device (9). The thickness (d), further status parameters (P4) and the control element position (p4) are supplied to the model (15), which determines the calibration value (sC4) of the respective roll stand (4) therefrom. Subsequently, normal operation is resumed and the previously determined calibration value (sC4) is used to determine control element positions (p4) to be adjusted as the calibration value (sC4) of the respective roll stand (4).

10 Claims, 4 Drawing Sheets

(51) Int. Cl.
B21B 38/04 (2006.01)
B21B 39/08 (2006.01)
G05B 19/05 (2006.01)
G05B 19/4155 (2006.01)

(52) U.S. Cl.
CPC ....... G05B 19/056 (2013.01); G05B 19/4155 (2013.01); G05B 2219/45145 (2013.01); G05B 2219/49033 (2013.01)

(56) References Cited

U.S. PATENT DOCUMENTS

| | | | |
|---|---|---|---|
| 6,216,503 | B1 | 4/2001 | Kitajima |
| 6,227,021 | B1* | 5/2001 | Imanari .................. B21B 37/22 72/11.4 |
| 7,152,661 | B2 | 12/2006 | Flemming |
| 7,320,237 | B2 | 1/2008 | Kubota |
| 7,481,089 | B2 | 1/2009 | Valence |
| 8,479,366 | B2 | 7/2013 | Cronier |
| 8,578,749 | B2 | 11/2013 | Klein |
| 10,286,434 | B2 | 5/2019 | Haverkamp |
| 2011/0099783 | A1 | 5/2011 | Cronier et al. ............ 29/402.08 |
| 2013/0055782 | A1 | 3/2013 | Klein |

FOREIGN PATENT DOCUMENTS

| | | |
|---|---|---|
| CN | 1732054 A | 2/2006 |
| CN | 101091967 A | 12/2007 |
| CN | 100415396 C | 9/2008 |
| CN | 101869914 A | 10/2010 |
| CN | 201603849 U | 10/2010 |
| CN | 102066015 A | 5/2011 |
| CN | 202123107 U | 1/2012 |
| CN | 202638875 U | 1/2013 |
| CN | 102933325 A | 2/2013 |
| CN | 103008586 A | 4/2013 |
| CN | 103182492 A | 7/2013 |
| CN | 103286142 A | 9/2013 |
| CN | 103302102 A | 9/2013 |
| CN | 203197060 U | 9/2013 |
| CN | 103506405 A | 1/2014 |
| CN | 103857478 A | 6/2014 |
| CN | 203778497 U | 8/2014 |
| CN | 104259212 A | 1/2015 |
| CN | 204194434 U | 3/2015 |
| CN | 104492816 A | 4/2015 |
| CN | 104998911 A | 10/2015 |
| CN | 109351780 A | 2/2019 |
| CN | 110227718 A | 9/2019 |
| DE | 1527761 A1 | 3/1970 |
| EP | 2 431 104 A1 | 3/2012 |
| EP | 2 620 233 A1 | 7/2013 |
| FR | 2 110 419 A1 | 6/1972 |
| GB | 2514599 B | 7/2015 |
| JP | S59-70412 A | 4/1984 |
| JP | S59-78707 A | 5/1984 |
| JP | S59-202107 A | 11/1984 |
| JP | S62-101307 A | 5/1987 |
| JP | S62-197211 A | 8/1987 |
| JP | S63-194811 A | 8/1988 |
| JP | S63-252607 A | 10/1988 |
| JP | S64-78612 A | 3/1989 |
| JP | H05-245516 A | 9/1993 |
| JP | H08-290208 A | 11/1996 |
| JP | H10-78612 A | 3/1998 |
| JP | 3348826 B2 | 11/2002 |
| JP | 2004-141886 A | 5/2004 |
| JP | 2004-255421 A | 9/2004 |
| JP | 2005-186085 A | 7/2005 |
| JP | 2010-274289 A | 12/2010 |
| JP | 2011-524810 A | 9/2011 |
| JP | 2012-045627 A | 3/2012 |
| JP | 2017-185505 A | 10/2017 |
| KR | 20020002044 A | 1/2002 |
| KR | 100685038 B1 | 2/2007 |
| WO | WO 2004/00493 8 A1 | 1/2004 |
| WO | WO 2005035155 A1 | 4/2005 |
| WO | WO 2011/1245 85 A1 | 10/2011 |

OTHER PUBLICATIONS

Written Opinion dated Apr. 18, 2017 in corresponding PCT International Application No. PCT/EP2017/051647.
Search Report dated Aug. 4, 2016 in corresponding European Patent Application No. 16156732.6.
Japanese Office Action, dated Dec. 2, 2019, issued in corresponding Japanese Patent Application No. 2018-544227. English translation. Total 11 pages.
Chinese Office Action, dated Jul. 3, 2020, issued in corresponding Chinese Patent Application No. 201780012842.0. English translation. Total 28 pages.
Indian Examination Report, dated Sep. 7, 2020, issued in corresponding Indian Patent Application No. 201817030327. Total 9 pages.
Chinese Notification to Grant Patent Right for Invention, dated Mar. 26, 2021, issued in corresponding Chinese Patent Application No. 201780012842.0. English translation. 6 pages.

* cited by examiner

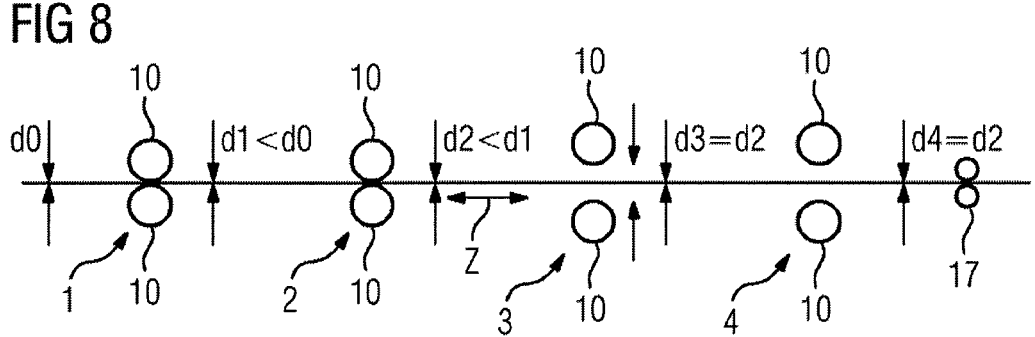
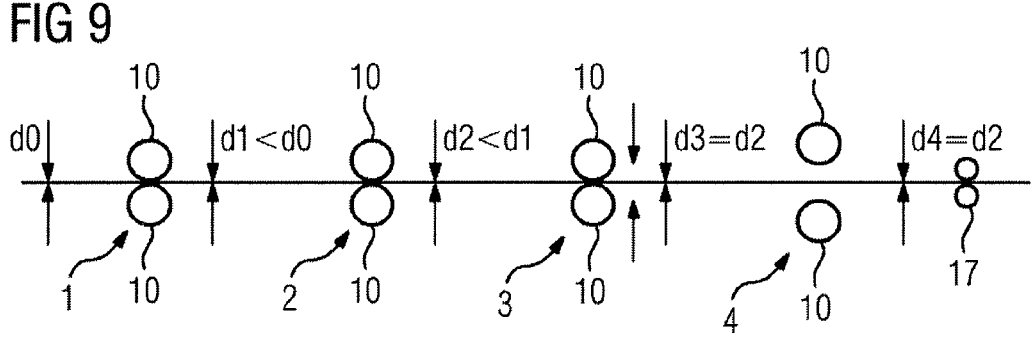
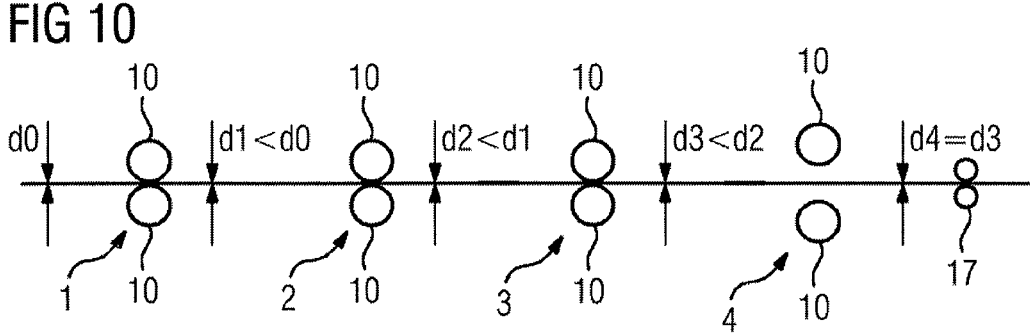

IN-LINE CALIBRATION OF THE ROLL GAP OF A ROLL STAND

CROSS-REFERENCE TO RELATED APPLICATIONS

The present application is a 35 U.S.C. §§ 371 national phase conversion of PCT/EP2017/051647, filed Jan. 26, 2017, which claims priority of European Patent Application No. 16156732.6, filed Feb. 22, 2016, the contents of which are incorporated by reference. The PCT International Application was published in the German language.

TECHNICAL BACKGROUND

The present invention proceeds from an operating method for a roll train having a plurality of roll stands for rolling a metal strip.

In relation to each respective roll stand, the roll stands are sometimes operated in a normal operation and sometimes operated in a calibration operation.

Work rolls of the respective roll stand are set at a roll gap such that the work rolls roll the metal strip during normal operation by setting a control element position of a control element of the respective roll stand.

A calibration value of the respective roll stand, further state parameters of the respective roll stand and a setpoint roll gap to be set are predetermined for a model describing the respective roll stand for the purposes of establishing the control element position to be set. The model establishes the control element position to be set on the basis of the calibration value, the further state parameters and the setpoint roll gap.

A control element position is initially set during the calibration operation such that the metal strip passes through the roll stand without being rolled by the work rolls. The control element position is thereupon varied during the calibration operation such that the work rolls roll the metal strip. A thickness of the metal strip is captured during the calibration operation by a thickness measuring device disposed downstream of the respective roll stand. The thickness is that thickness with which the metal strip runs out of the respective roll stand.

Furthermore, the present invention includes a computer program for a control device of a roll train having a plurality of roll stands for rolling a metal strip. The computer program comprises machine code stored on a non-transitory storage medium and the code is immediately executable by the control device, wherein executing the machine code by the control device causes the control device to operate the roll train according to such an operating method.

Furthermore, the present invention includes a control device of a roll train having a plurality of roll stands for rolling a metal strip, wherein the control device is embodied in such a way that it operates the roll train according to such an operating method.

Furthermore, the present invention proceeds from a roll train having a plurality of roll stands for rolling a metal strip, wherein the roll train is controlled by such a control device.

The rolls of roll stands wear during operation. Therefore, once the affected rolls have reached a critical extent of wear, those rolls have to be replaced. Work rolls of the roll stands wear particularly strongly, in particular the work rolls of the rear roll stands of the roll train on account of their higher strip speed.

In cold rolling mills, the roll train is stopped for replacing the rolls. Therefore, replacement is possible without problems. In conventional hot rolling mills, the slabs being rolled can be temporarily stored in a furnace. The roll replacement can be carried out during the temporary storage. Here, too, replacement is possible without problems.

In a continuous casting and rolling installation, such as an ESP installation, the cast metal bar is supplied continuously within a casting sequence. Temporary storage of a bar is not possible. Therefore, the continuous casting machine would have to be deactivated and the roll train driven empty in order to replace worn rolls. After replacing the rolls, the casting and rolling installation would have to be activated again and ramped up to stationary operation. However, this procedure would lead to a significant reduction in the overall productivity of the installation. Alternatively, it is possible to discharge the produced slabs between a first roll train and a second roll train disposed downstream of the first roll train and thus take the second roll train out of production. In this case, the roll replacement can be undertaken within the second roll train. However, the produced metal bar can no longer be rolled to the final dimensions of a thin wide strip.

Because there is particularly strong wear on the work rolls, in particular, of the rear work stands, the work rolls of the rear roll stands have to be replaced more often than the work rolls of the front roll stands. Nevertheless, in the prior art, the entire roll train has to be deactivated even though it is only necessary to replace the work rolls of a single roll stand. The productivity of the overall installation reduces with the frequency of the installation downtimes connected with roll replacement.

WO 2011/124 585 A1 has disclosed a method for replacing work rolls in continuous casting and rolling installations and hot strip rolling mills, in which the work rolls are replaced on the fly, i.e., during rolling, that is in the case of a running strip. In this method, a strip tension is applied to the metal strip before and/or after entering the roll stand in calibration operation by means of at least one hold-down roll that is introducible into the pass line.

WO 2004/004 938 A1 has disclosed the practice of dividing a metal bar cast by a continuous casting machine into predetermined lengths and rolling the individual lengths. Should a roll replacement be carried out, the casting speed of the continuous casting installation is reduced such that a greater time window is available for replacing the rolls of the roll train.

JP S59 070 412 A has disclosed the practice of providing drivers before and after a roll stand. The drivers are activated when the work rolls of the roll stand should be replaced. They serve to apply a defined strip tension to the metal strip toward the upstream and downstream roll stand.

US 2011/0 099 783 A1 has disclosed the practice of equipping a roll train with one roll stand more than is actually required. Normally, the additional roll stand is inactive; i.e., it does not roll the metal strip. Should the work rolls be replaced in an active roll stand (i.e., a roll stand rolling the metal strip), the additional roll stand is activated and assumes the function of one of its adjacent roll stands. The adjacent roll stand, in turn, assumes the function of its adjacent roll stand, etc., until the roll stand whose work rolls should be replaced is reached. This roll stand is now inactive. Therefore, it is possible to replace its work rolls. After replacing the work rolls, the process is carried out in the reverse sequence and the roll stand whose work rolls were replaced is activated again thereby.

The roll stand has to be recalibrated after replacing the rolls of the roll stand. The calibration is possible without problems if there is no metal strip between the work rolls of the roll stand at the time of calibration. In this case, the roll gap is closed under rolling force regulation for calibration purposes by means of the control element, usually a hydraulic cylinder unit, until a defined rolling force is obtained. Thereupon, the calibration value of the roll stand is established on the basis of the control element position at that moment in conjunction with the further state parameters of the roll stand. The established calibration value is stored. In subsequent normal operation, the calibration value established during the calibration operation is then used for establishing the control element position, to be set, as a calibration value of the roll stand.

This procedure is not possible in the case of a replacement of the work rolls on the fly, i.e., when replacing the work rolls during running rolling operation. Therefore, it is necessary to find another option for calibrating the roll stand.

SUMMARY OF THE INVENTION

The object of the present invention consists of specifying options for calibration of the roll stand even though the roll stand to be calibrated is occupied with rolling stock, i.e., even though a metal strip is situated in the roll gap of the roll stand.

This object is achieved by operating methods disclosed herein.

According to the invention, an operating method of the type set forth at the outset is configured such that the thickness, the further state parameters and the control element position are supplied to the model. The model then establishes the calibration value of the respective roll stand on the basis of the thickness, the further state parameters and the control element position.

This is followed by a transition from the calibration operation to the normal operation and the calibration value established in the calibration operation is used during the normal operation for establishing the control element position to be set as the calibration value of the respective roll stand.

As a rule, there are no thickness measuring devices between the individual roll stands of the roll train. Instead, a thickness measuring device is only arranged after the ultimate or final roll stand of the roll train. Therefore, for implementing the procedure according to the invention, it is necessary that either no further roll stand is arranged between the respective roll stand and the thickness measuring device or that, although at least one further roll stand is arranged between the respective roll stand and the thickness measuring device, a respective control element position is set for all further roll stands during the calibration operation of the respective roll stand such that the metal strip passes through the respective further roll stand without being rolled by work rolls of the respective further roll stand.

Preferably, the roll train has a driver which is disposed downstream of the respective roll stand. In this case, the driver applies a pull on the metal strip on the run-out side of the respective roll stand during the calibration operation of the respective roll stand. However, the driver only applies a pull on the metal strip. It does not carry out a plastic deformation of the metal strip. Thus, the thickness of the metal strip after the driver equals the thickness of the metal strip before the driver.

The driver could be disposed immediately downstream of the respective roll stand; i.e., no other roll stands or other drivers are situated between the respective roll stand and the driver. Alternatively, other roll stands could be situated between the respective roll stand and the driver. In particular, the driver can be arranged downstream of the ultimate or final roll stand of the roll train. However, in this case, a respective control element position in the other roll stands is set in such a way that the metal strip passes through the respective further roll stand without being rolled by work rolls of the respective further roll stand.

As a rule, the roll train has a loop lifter disposed upstream of the respective roll stand. The loop lifter disposed upstream of the respective roll stand is kept at a defined elevation during the calibration operation. This prevents the metal strip from contacting the work rolls of the respective roll stand during the roll replacement.

Should the respective roll stand not be the ultimate or final roll stand of the roll train, the roll train, as a rule, also has a loop lifter disposed downstream of the respective roll stand. In this case, the loop lifter disposed downstream—in a manner analogous to the upstream loop lifter—is kept at a defined elevation during the calibration operation.

As a rule, at least one other roll stand is disposed upstream of the respective roll stand. In this case, a pass sequence, according to which the other roll stands are operated, preferably remains unchanged, from the moment at which the varying of the control element position of the control element of the respective roll stand starts until the moment at which there is a transition from the calibration operation to the normal operation in respect of the respective roll stand. As result, a thickness of the metal strip can be steadily kept virtually constant during the calibration of the respective roll stand, in particular on the run-in side of the respective roll stand.

After the moment at which there is a transition from the calibration operation to the normal operation in respect of the respective roll stand, there is a pass sequence that could be modified, according to which the respective roll stand and the other roll stands (i.e., the upstream roll stands) are operated. As a result, it is possible to optimize a load distribution between the individual roll stands.

Furthermore, the object is achieved by a computer program having the features disclosed herein. According to the invention, a computer program product of the type set forth at the outset is configured such that executing the computer program, which is stored on a non-transitory storage medium, by a control device causes the control device to operate the roll train according to an operating method according to the invention.

Furthermore, the object is achieved by a control device having the features disclosed herein. According to the invention, the control device is embodied such that it operates the roll train according to an operating method according to the invention.

Furthermore, the object is achieved by a roll train having the features disclosed herein. According to the invention, a roll train of the type set forth at the outset is configured so that the roll train is controlled by a control device according to the invention.

The above-described characteristics, features and advantages of this invention and the manner in which these are achieved will become clearer and more easily understandable in conjunction with the following description of the exemplary embodiments, which are explained in more detail in conjunction with the drawings. Schematically here in the Figures:

BRIEF DESCRIPTION OF THE DRAWINGS

FIG. 7 shows the inverse mode of operation of the model in

FIG. 3 and

FIGS. 8 to 10 show a sequence of states of the roll train during a calibration operation of another roll stand of the roll train.

DESCRIPTION OF EMBODIMENTS

Figure 1:
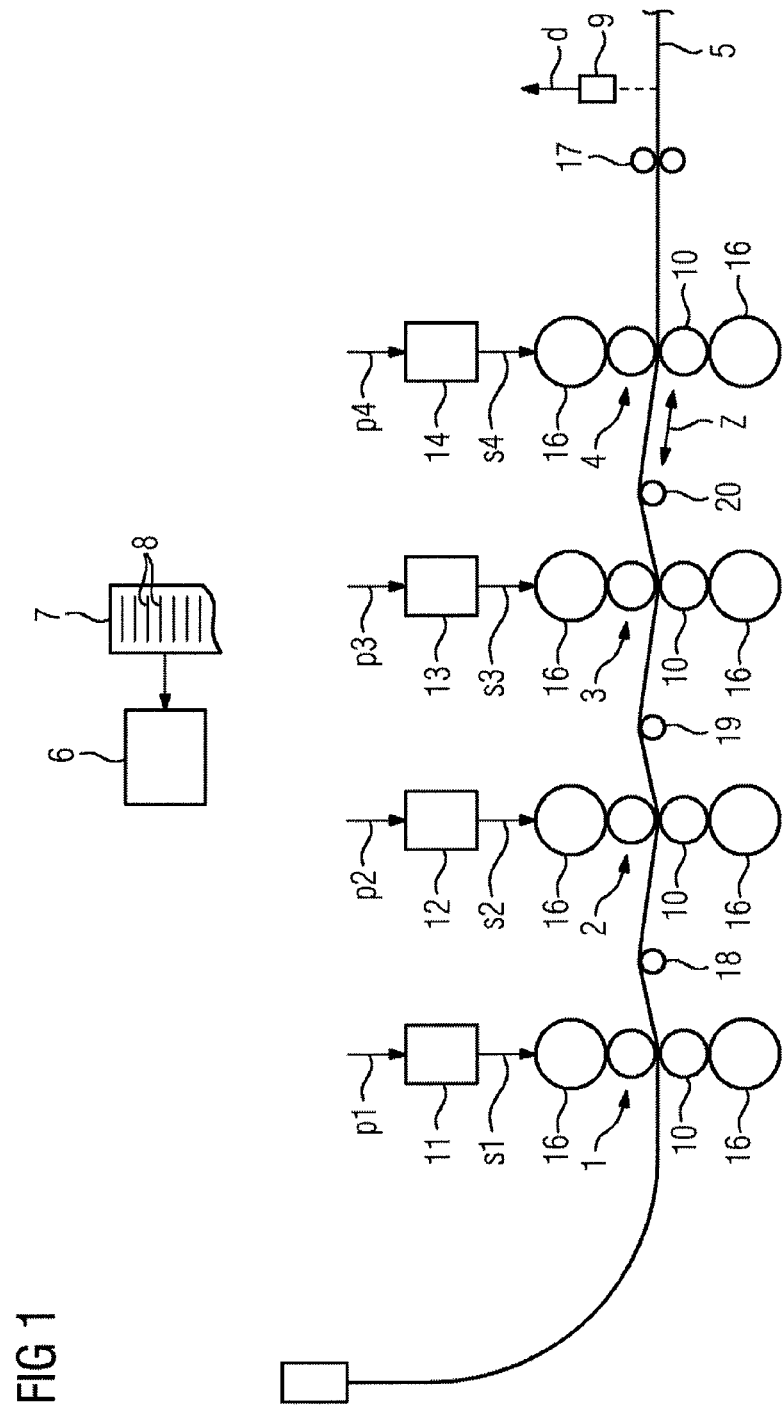
FIG. 1 shows a roll train having a plurality of roll stands.

According to FIG. 1, a roll train has a plurality of roll stands. The number of roll stands may vary. FIG. 1 illustrates a roll train with four roll stands, which are denoted successively by reference signs 1 to 4. However, alternatively, any other number of roll stands may likewise be present, in particular 2, 3, 5, 6, 7 or 8 roll stands. A metal strip 5 is rolled by the roll stands 1 to 4 of the roll train. By way of example, the metal strip 5 can be a steel strip or an aluminum strip. As a rule, the rolling in the roll train is hot rolling. Often, a continuous casting machine is disposed upstream of the roll train corresponding to the schematic illustration of FIG. 1. However, this is of minor importance within the scope of the present invention.

The roll train is controlled by a control device 6. The control device 6 is embodied in such a way that it operates the roll train according to an operating method that is explained in more detail below.

As a rule, the control device 6 is embodied as a software-programmable control device. In this case, the corresponding embodiment of the control device 6 is caused to operate by a computer program 7, by means of which the control device 6 is programmed. The computer program 7 comprises machine code 8, stored on a non-transitory storage medium and the code is directly executable by the control device 6. In this case, executing the machine code 8 by the control device 6 causes the control device 6 to operate the roll train according to the corresponding operating method.

Figure 2:
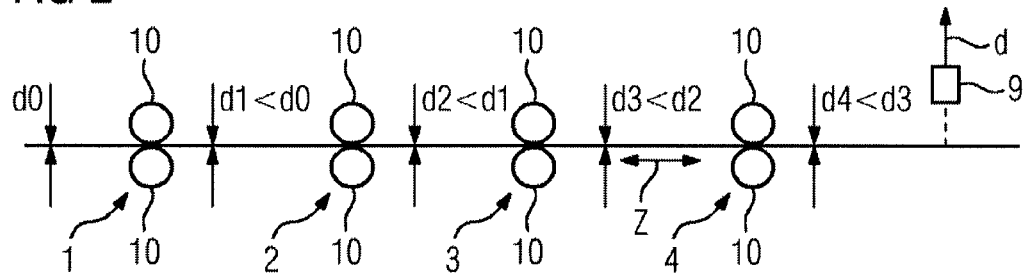
FIG. 2 shows a normal operation of the roll stands in the roll train.

During normal operation of the roll stands 1 to 4, according to FIG. 2, there is rolling from an initial thickness d0 to an end thickness d. Each of the roll stands 1 to 4 is considered to be in normal operation if, and for as long as, it rolls the metal strip 5 according to a predetermined pass sequence to a run-out-side thickness d1 to d4, predetermined for the respective roll stand 1 to 4, and consequently the roll train, as seen over the totality of roll stands 1 to 4, rolls the metal strip 5 from the initial thickness d0 to the end thickness d.

A thickness measuring device 9 is disposed downstream of the roll stands 1 to 4 of the roll train. The end thickness d of the metal strip 5 is captured by means of the thickness measuring device 9. The corresponding measurement value is supplied to the control device 6.

Referring to FIG. 1, so that the respective roll stand 1 to 4 rolls the metal strip 5 to its respective run-out-side thickness d1 to d4, the roll stands 1 to 4, or the work rolls 10 thereof, must be set to a respective roll gap s1 to s4. The roll gaps s1 to s4 are set (FIG. 1) by control elements 11 to 14, which are hydraulic cylinder units, as a rule. In particular, the respective control element 11 to 14 is set to a respective control element position p1 to p4 to this end. The control element positions p1 to p4 are determined in such a way that the respective roll gap s1 to S4 is set.

The present invention is initially explained below in conjunction with the ultimate roll stand 4 of the roll train containing four stands. However, the appropriate explanations also apply to the other roll stands 1 to 3 of the roll train. Additionally, the explanations apply if the roll train has a different number of roll stands 1 to 4, i.e., for example, 6 or 7 roll stands.

Figure 3:
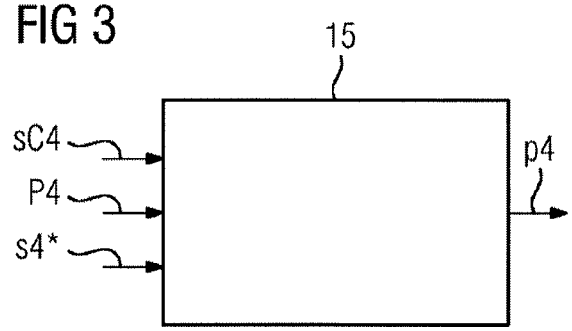
FIG. 3 shows the mode of operation of a model.

The control device 6 implements a model 15 in FIG. 3 for the roll stand 4, on account of the programming by the computer program 7, as a rule. The model 15 describes the roll stand 4. For the purposes of establishing the control member position p4 to be set, a calibration value sC4 of the roll stand 4, further state parameters P4 of the roll stand 4 and the setpoint roll gap s4* to be set are predetermined for the model 15 according to FIG. 3. Thereupon, the model 15 establishes the control element position p4 to be set on the basis of the calibration value sC4, the further state parameters P4 and the setpoint roll gap s4*.

The corresponding procedure is generally known to a person skilled in the art. It is explained below for the case where the roll stand 4 is embodied as a four-high stand, i.e., as a roll stand which has backup rolls in addition to the work rolls 10. However, analogous procedures are also known to a person skilled in the art for other roll stands, for example six-high stands, in which intermediate rolls are present in addition to the work rolls 10 and the backup rolls 16.

The modeled roll stand 4 is modeled by individual elements within the scope of the model 15. It is possible to consider the elements to be mechanical springs. For example, the elements are formed by the rolling stand column, an upper and a lower pressure plate, rolling force load cells, the rolls 10, 16 of the roll stand 4, roll bearings, a device for reverse bending of the work rolls 10 and the control element 14 for setting the roll gap s4. A resilient elasticity is ascribed to the elements, individually or together. Furthermore, at least some of these elements may also be plastically deformed, for example the work rolls 10 by thermal crown and wear. The resilient elasticity may be linear or nonlinear. In particular, the elasticity occurring on account of the roll flattening is strongly nonlinear. Also, there may be dependencies with other variables, such as the roll speed, for example.

Furthermore, three basic states of the roll stand 4 should be considered, namely State 1: roll gap s4 open, work rolls 10 lifted, no contact of the rolls with one another, no metal strip is situated in the roll gap.

State 2: roll gap s4 closed, likewise no metal strip 5 in the roll gap s4 (i.e., the work rolls 10 contact one another), work rolls 10 are lifted (i.e., the device for reverse bending of the work rolls 10 exerts a reverse-bending force on the work rolls 10, which compensates the weight of the upper roll 10).

State 3: roll gap s4 closed, metal strip 5 in the roll gap s4.

For state 1, the roll gap s4 emerges from the clear width of the window of the roll stand column, from which the individual dimensions of the further elements of the roll stand 4 are subtracted. Those further elements in particular include the radii of the backup rolls 16, the diameters of the work rolls 10, the effective installation height of the backup roll inserts and of the pressure plates, an offset for the control element 14 for setting the roll gap s4 (usually referred to as a collapsed hydraulic adjustment) and the control element position p4. Additionally, compensation values are subtracted therefrom, in particular for taking account of the thermal crown and the wear of the work rolls 10 and a compensation from modeling the backup roller bearings.

The measurement of the rolling force is tared in state 1; i.e., the currently set value is set to 0. Now, the lift of the hydraulic adjustment 14 is gradually increased until the work rolls 10 touch (the so-called kissing point). There is a transition into state 2 once the kissing point is reached.

When the roll gap s4 is closed, it reaches a value of 0. The roll gap s4 cannot assume a smaller value. If the lift of the hydraulic adjustment 14 is further increased, this increase must be compensated by corresponding spring back of the roll stand 4 or of elements of the roll stand 4. Therefore, the roll gap s4 can be established as $$s4=sCAL4-p4+sC4+D4+BM4+A4+L4+TW4+s04. \quad (1)$$

Here, the variables used in the equation above have the following meaning:

s4 is the roll gap s4.

sCAL4 is a theoretical roll gap that is assumed at the calibration point. It applies to the rolling force used in calibrating the roll gap s4.

p4 is the control element position p4. It is captured using measurement technology.

sC4 is the control element position at which the theoretical roll gap sCAL4 is assumed. This value corresponds to the calibration value sC4 for the roll stand 4.

D4 is the spring back of the roll stand 4. It can readily be established by way of the spring characteristic of the roll stand 4 in conjunction with the current rolling force and the rolling force when calibrating the roll gap s4.

BM4 is the compensation for the bending of the work rolls 10. It can be established by means of conventional roll bending models.

A4 is the compensation for the flattening of the work rolls 10 and, optionally, of the backup rolls 16 as well. It can be established by means of conventional flattening models.

L4 is the compensation for the resilience of the bearings of the backup rolls 16. It can be established by means of usual models for the position of the backup rolls 16.

TW4 is the compensation for the thermal crown and the wear of the work rolls 10. It can be established by means of usual models for the thermal crown and the wear of the work rolls 10.

s04 is a zero-point correction. It needs to be parameterized only once.

From the equation above, it is clear, inter alia, that any control element position p4, in principle, can be used as calibration value sC4. The only precondition is that the roll stand 4 is in state 2. Preferably, the calibration value sC4 is established at a mid rolling force. In particular, there can be a rolling-force-regulated adjustment of the work rolls 10. After reaching the parameterized rolling force (calibration rolling force), the calibration value sC4 is stored and kept until the calibration value sC4 is established again.

Other modeling is possible, too. However, independently of the precise structure of the model 15, the model 15 is able to establish the control element position p4 to be set on the basis of the variables sC4, P4, s4* supplied thereto. Thus, the model 15 is able to convert the ultimately desired setpoint roll gap s4* into the control element position p4 to be set, which is required to this end.

The work rolls 10 (sometimes, additionally, the backup rolls 16 as well) of the roll stand 4 have to be replaced from time to time. In this case, the roll stand 4 is opened up by a corresponding actuation of the control element 14 such that the work rolls 10 no longer roll the metal strip 5 and even no longer contact the latter. Thus, the metal strip 5 passes through the roll stand 4 without contacting the work rolls 10 thereof. Opening up the roll stand 4 may be connected to a load redistribution from the roll stand 4 to the other roll stands 1 to 3. Alternatively, the loads of the other roll stands 1 to 3 may be maintained. Which of these two procedures is taken up is of minor importance within the scope of the present invention. What is decisive is that the roll stand 4 transitions into a special operation with the opening up for the roll replacement, namely the roll replacement operation. To the extent that the casting machine is disposed upstream of the roll train, a casting speed of the casting machine may be furthermore reduced.

The work rolls 10 are thereupon replaced. To the extent that this is necessary, the backup rolls 16 are replaced, too. Replacement of the work rolls 10 and, optionally, of the backup rolls 16, too, can be carried out in a manner known per se. The way of carrying out the roll replacement, too, is of minor importance within the scope of the present invention. What is decisive is that the roll stand 4 transitions into a calibration operation as soon as the roll replacement has been completed.

Figure 4:
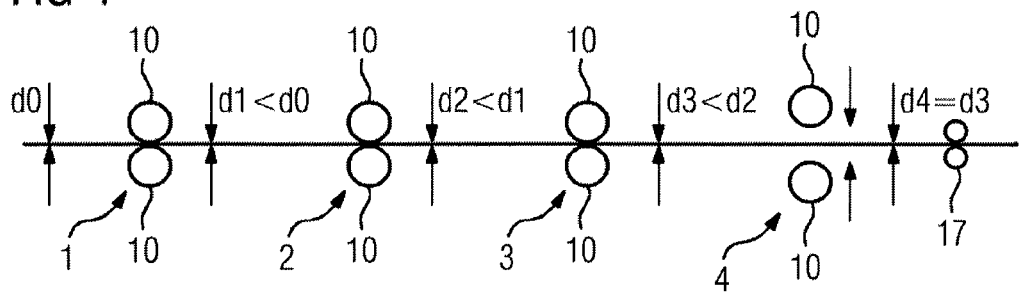
FIGS. 4 to 6 show a sequence of states of the roll train during a calibration operation of the ultimate roll stand of the roll train.

At the moment of the transition into the calibration operation, the roll stand 4 is still opened up according to the illustration in FIG. 4. Consequently, a control element position p4 is set in such a way at the start of the calibration operation that the metal strip 5 passes through the roll stand 4 without being rolled by the work rolls 10 of the roll stand 4. However, corresponding to the illustration in FIG. 4, the metal strip 5 is rolled in the other roll stands 1 to 3 to the respective run-out-side thicknesses d1 to d3. In particular, the run-out-side thickness d3—which corresponds to the end thickness d at this time—may lie between 3.5 mm and 1.5 mm, for example at 2.0 mm.

Figure 5:
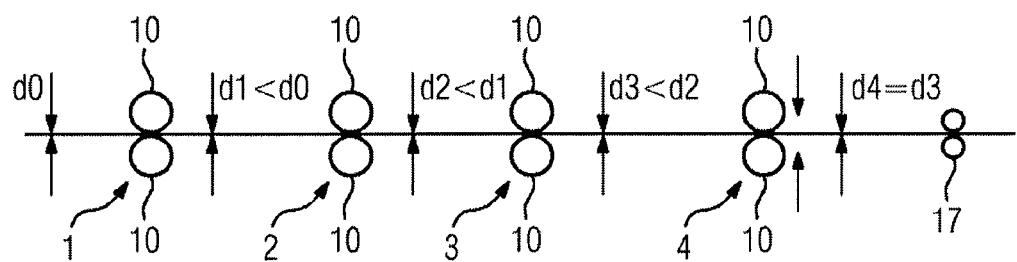

If desired or necessary, the state in FIG. 4 can be maintained for a certain period of time. However, independently of the length of this period of time, the control element position p4 is varied, proceeding from the state in FIG. 4, in the calibration operation as this period of time elapses. In particular, the associated roll gap s4 is successively closed. In FIG. 4, closing of the roll gap s4 is indicated by arrows next to the work rolls 10 of the roll stand 4. FIG. 5 shows the state in which the work rolls 10 of the roll stand 4 have just touched the metal strip 5, but just do not roll the latter. If no metal strip 5 were situated between the work rolls 10, this state would correspond to the kissing point. At this time, the metal strip 5 has the thickness d3 as end thickness d, both on the run-in side and on the run-out side of the roll stand 4. The thickness measuring appliance 9, too, captures the thickness d3 as end thickness d.

Figure 6:
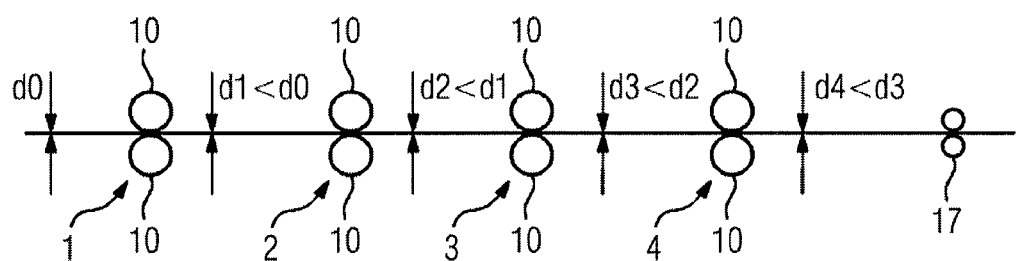

However, proceeding from the state in FIG. 4, the control element position p4 is not only varied so far that the work rolls 12 of the roll stand 4 are just placed on the metal strip 5. Rather, the roll gap s4 is closed even further until a (preliminary) end state is reached. The preliminary end state corresponds to an estimate that is as good as possible of the state in which the roll stand 4 rolls the metal strip 5 to a desired end thickness d. The even further closing of the roll gap s4 is illustrated in FIG. 5—analogously to FIG. 4—by arrows next to the work rolls 10 of the roll stand 4. The preliminary end state is illustrated in FIG. 6. According to FIG. 6, the control element position p4 is set in such a way that the work rolls 10 of the roll stand 4 roll the metal strip 5, i.e., reduce the thickness thereof. After the roll stand 4, the metal strip 5 thus has the run-out-side thickness d4, wherein the run-out-side thickness d4 is less than the run-out-side thickness d3 behind the roll stand 3 disposed upstream thereof. In particular, the run-out-side thickness d4 can lie between 3.0 mm and 1.0 mm, for example at 2.0 mm. As a rule, the ratio of the run-out-side thickness d4 to the run-out-side thickness d3 lies between 0.8 and 0.95.

Corresponding to the illustration in FIG. 6, the thickness measuring device 9 initially still captures the value d3 as end thickness d. However, once the length of the metal strip 5 rolled by the roll stand 4 is sufficiently large, the thickness measuring device 9 captures the value d4 as end thickness d.

The end thickness d captured by the thickness measuring device is continuously supplied to the control device 6. Furthermore, the control device 6 establishes a time at which the end thickness d changes from the value d3 to the value d4. By way of example, to this end, the control device 6 can evaluate the temporal profile of the end thickness d for a corresponding thickness jump. Alternatively, it is possible for the control device 6 to track the travel of the metal strip 5. Tracking a travel is generally known to persons skilled in the art.

Figure 7:
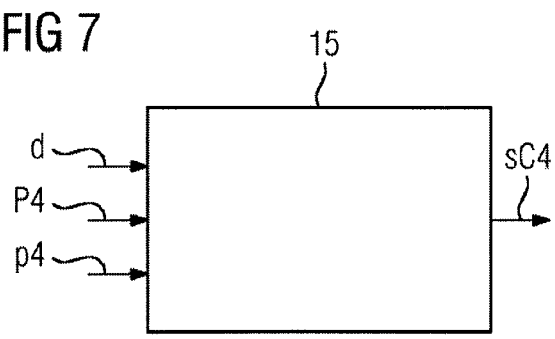

Independently of how the control device 6 establishes the time of the thickness jump, the thickness d, the further state parameters P4 and the control element position p4 are supplied to the model 15 after this time, corresponding to the illustration in FIG. 7. On the basis of the thickness d, the further state parameters P4 and the control element position p4, the model 15 establishes the calibration value sC4 of the roll stand 4.

It is possible that a direct inversion of the model 15 is possible, i.e., that the calibration value sC4 of the roll stand 4 can be established directly on the basis of the thickness d, the further state parameters P4 and the control element position p4. In particular, equation (1) can be resolved for the calibration value sC4. Alternatively, it is possible to initially set a preliminary calibration value sC4 of the roll stand 4, establish the roll gap s4 on the basis of the thickness (it is only necessary to adopt the thickness d as roll gap s4 in the simplest case) and supply the preliminary calibration value sC4, the roll gap s4 and the further state parameters P4 to the model 15. Depending on the control element position p4 established by the model 15, the preliminary calibration value sC4 can be corrected upwards or downwards in this case. Provided that this is necessary, this procedure can be repeated several times until a sufficient correspondence is achieved between the control element position p4 and the control element position p4 established by means of the model 15.

The calibration operation is completed once the calibration value sC4 has been established. Therefore, there is a transition from the calibration operation to the normal operation in respect of the roll stand 4. As already explained above, the control element position p4 to be set is established by means of the model 15 on the basis of the calibration value sC4 of the roll stand 4, the further state parameters P4 and the roll gap s4 to be set. The calibration value sC4, which is used by the model 15, is the calibration value that was established during the calibration operation. Should the measured end thickness d deviate from a desired end thickness, the control element position p4 is furthermore immediately updated at the start of the normal operation in order to set the roll gap s4 in such a way that the metal strip 5 is rolled to the desired end thickness d.

The roll stand 4 is active during normal operation; i.e., it rolls the metal strip 5. Therefore, in particular, in FIG. 1 it is also possible to exert a pull Z on the metal strip 5 towards the roll stand 3 disposed upstream of the roll stand 4. In particular, the pull Z is required to ensure stability of the roll process. However, the roll stand 4 is opened up for replacing the rolls 10, 16 of the roll stand 4. Therefore, it cannot exert a pull on the metal strip 5. In order nevertheless to be able to continue to exert the pull Z on the metal strip 5, a driver 17 is disposed downstream of the roll stand 4 according to the illustrations in FIG. 1 and Figures to 7. Corresponding to the illustration in FIG. 1, the driver 17 can be disposed upstream of the thickness measuring device 9. Alternatively, the driver 17 can be disposed downstream of the thickness measuring device 9. The driver 17 applies a defined pull Z on the metal strip 5 at the run-out side of the roll stand 4 during the calibration operation. Adopting the pull Z by the driver 17 when opening up the roll stand 4 can be implemented in a jerk-free manner.

In contrast to the roll stand 4, the driver 17 does not cause any plastic cross-sectional reduction of the metal strip 5. Thus, the metal strip 5 has the same end thickness d both before and after the driver 17. The value of the pull Z is preferably identical to the pull Z that was exerted previously by the roll stand 4 on the metal strip 5 during the normal operation. On account of the circumstances that the roll stand 4 is opened up during the calibration operation (at least at the start of the calibration operation), the pull Z however propagates through the roll stand 4 to the roll stand 3 arranged before the roll stand 4. This applies until the work rolls 10 of the work stand 4 reestablish contact with the metal strip 5 during the calibration operation. In this state, it is possible for the pull Z to be adopted by the roll stand 4 without jerk when the roll gap s4 is closed.

Furthermore, loop lifters 18 to 20 are often arranged between the roll stands 1 to 4 of the roll train. The length of metal strip 5 extending between the roll stands 1 to 4 is varied by means of the loop lifters 18 to 20. These loop lifters influence the pull Z between the roll stands 1 to 4. In particular, the loop lifter 20 is disposed upstream of the ultimate or final roll stand 4. During the replacement of the rolls 10, 16 of the roll stand 4, and also during the calibration operation of the roll stand 4, the loop lifter 20 is kept at a defined and constant elevation. The elevation is determined so that the metal strip 5 does not impede the replacement of the rolls 10, 16 of the roll stand 4.

Furthermore, the roll stands 1 to 3 are disposed upstream of the roll stand 4. During normal operation of the roll train (i.e., if all roll stands 1 to 4 of the roll train are in normal operation), it is possible to change the pass sequence of the roll train from time to time, i.e., newly predetermine the individual run-out-side thicknesses d1 to d4 and the associated operating parameters of the roll stands 1 to 4. The pass sequence of the roll train may, under certain circumstances, be changed for the upstream roll stands 1 to 3 while the rolls 10, 16 of the roll stand 4 are replaced. Alternatively, the pass sequence for the upstream roll stands 1 to 3 can be maintained. A change in the pass sequence for the upstream roll stands 1 to 3 is also possible during the calibration operation. However, within the scope of the present invention, the pass sequence for the upstream roll stands 1 to 3 is preferably no longer changed after the moment at which the varying of the control element position p4 of the control element 14 of the ultimate roll stand 4 is started. Expressed differently: for as long as the work rolls 10 of the roll stand 4 are situated statically in the positioning shown in FIG. 4, it is possible to change the pass sequence of the roll train for the upstream roll stands 1 to 3. However, the pass sequence for the upstream roll stands 1 to 3 is maintained unchanged from the moment at which the changing of the control element position p4 is started.

In particular, the pass sequence for the upstream roll stands 1 to 3 is maintained until the control device 6 has established the calibration value sC4 of the ultimate roll stand 4 and the ultimate roll stand 4 once again adopts normal operation. From this moment, it is possible to again change the pass sequence of the roll train, this time not only for the upstream roll stands 1 to 3, but for the roll stands 1 to 4. For example, a pure load redistribution can be undertaken or the metal strip 5 can be rolled to a new end thickness d.

Until now, the present invention has been explained for the ultimate or final roll stand 4 of the roll train. In this case, no further roll stand is arranged between the roll stand 4 and the thickness measuring device 9. However, the calibration according to the invention of a roll stand 1 to 4 is also possible when at least one further roll stand 2 to 4 is arranged between the respective roll stand 1 to 3 and the thickness measuring device 9. This is explained below in an exemplary manner for the penultimate roll stand 3 of the roll train in conjunction with FIGS. 8 to 10.

The procedure in relation to the penultimate roll stand 3 is, in terms of its approach, identical to the procedure in respect of the ultimate roll stand 4. The explanations made above in relation to the procedure at the ultimate roll stand 4 are applicable 1:1. However, in accordance with the illustration in FIGS. 8 to 10, the control element position p4 in the ultimate roll stand 4 is set during the period of time in which the penultimate roll stand 3 is in the calibration operation in such a way that the metal strip 5 passes through the ultimate roll stand 4 without being rolled by work rolls 10 of the ultimate roll stand 4. As a rule, the control element position p4 is set in such a way that the work rolls 10 of the ultimate roll stand 4 do not touch the metal strip 5. Therefore, the roll gap s4 of the ultimate roll stand 4 is opened up. In this case, the upstream roll stands are the first and the second roll stand 1, 2.

On account of the circumstances that the ultimate roll stand 4 of the roll train is opened up, the pull Z applied by the driver 17 onto the metal strip 5 acts directly on the run-out side of the roll stand 2. In order to ensure that the metal strip 5 does not impede the replacement of the work rolls 10 of the roll stand 3, in respect of the roll stand 3, it is furthermore not only the loop lifter 19 but also the loop lifter 20 that is kept at a defined elevation when replacing the rolls 10, 16 of the roll stand 3 and also during the calibration operation of the roll stand 3. Provided that changes to the pass sequence are undertaken, these changes to the pass sequence during the calibration operation of the roll stand 3 are restricted to the roll stands 1 and 2 disposed upstream of the roll stand 3.

The roll stand 2 can also be calibrated in an analogous fashion. What is important in this case is that the control element positions p3, p4 at the penultimate roll stand 3 and at the ultimate roll stand 4 are respectively set in such a way during the period of time during which the roll stand 2 is in the calibration operation that the metal strip 5 passes through the corresponding roll stand 3, 4 without being rolled by work rolls 10 of the respective roll stand 3, 4. In this case, the upstream roll stand is the roll stand 1.

In principle, it is possible to replace the rolls 10, 16 of one of the front roll stands 1 to 3, for example, of the penultimate roll stand 3, without at the same time also replacing the rolls 10, 16 of the roll stands 2 to 4 disposed downstream of the relevant roll stand 1 to 3, for example, the ultimate roll stand 4. This is because all that is mandatory is that the roll stands 2 to 4 disposed downstream of the respective roll stand 1 to 3 are opened up. As a rule, however, the rolls 10, 16 of all downstream roll stands 2 to 4 are also replaced together with the rolls 10, 16 of a certain roll stand 1 to 3. In this case, the calibration of the roll stands 1 to 4, the rolls 10, 16 of which were replaced, is carried out sequentially in the strip running direction.

In summary, the present invention consequently relates to the following circumstances:

During the normal operation of a roll stand, e.g. 4, of a roll train, work rolls 10 of the roll stand 4 are set to a roll gap s4 by setting a control element position p4 of a control element 14 of the roll stand 4 in such a way that the work rolls 10 roll the metal strip 5. For the purposes of establishing the control element position p4 to be set, a calibration value sC4 of the roll stand 4, further state parameters P4 of the roll stand 4 and a setpoint roll gap s4* are predetermined for a model 15 of the roll stand 4. From this, the model 15 establishes the control element position p4 to be set. During the calibration operation, a control element position p4 is initially set in such a way that the metal strip 5 passes through the roll stand 4 without being rolled. The control element position p4 is varied such that the work rolls 10 roll the metal strip 5. A thickness d of the metal strip 5 is captured by means of a downstream thickness measuring device 9. The thickness d, the further state parameters P4 and the control element position p4 are supplied to the model 15, which establishes a calibration value sC4 therefrom. Thereupon, there is a transition again into the normal operation and the previously established calibration value sC4 is used here for establishing control element positions p4 to be set as a calibration value sC4 of the respective roll stand 4.

The present invention has many advantages. In particular, it is possible to highly precisely calibrate the roll stands 1 to 4 despite the replacement of the rolls 10, 16 of roll stands 1 to on the fly, without having to interrupt the continuous operation of the roll train. Downtimes and reductions in productivity connected therewith can be avoided. Furthermore, the calibration is possible not only when the replaced work rolls 10 have a smooth surface. Rather, the calibration is also possible if the replaced work rolls 10 have a defined surface contour, for example fluting.

Even though the invention, in detail, was illustrated and described in more detail by way of the preferred exemplary embodiment, the invention is not restricted by the disclosed examples and other variations can be derived herefrom by a person skilled in the art, without departing from the scope of protection of the invention.

LIST OF REFERENCE SIGNS 1 to 4 Roll stands
5 Metal strip
6 Control device
7 Computer program
8 Machine code
9 Thickness measuring device
10 Work rolls
11 to 14 Control elements
15 Model
16 Backup rolls
17 Driver
18 to 20 Loop lifters
d0 Initial thickness
d End thickness
d1 to d4 Run-out-side thicknesses
P1 to P4 State parameters
p1 to p4 Control element positions
s1 to s4 Roll gaps
s1* to s4* Setpoint roll gaps
sC1, sC4 Calibration values
Z Pull

The invention claimed is:

1. An operating method for a roll train having a plurality of roll stands for rolling a metal strip, the method comprising:
operating the plurality of roll stands in a normal operation;
wherein during the normal operation,
setting work rolls of a respective roll stand to define a roll gap between the work rolls such that the work rolls roll the metal strip in a downstream direction, the setting of the work rolls being performed by setting an actuator position of an actuator of the respective roll stand,
wherein the actuator position is established by predetermining a calibration value of the respective roll stand, further state parameters of the respective roll stand and a setpoint roll gap for a model describing the respective roll stand, and the model establishing the actuator position on the basis of the calibration value, the further state parameters and the setpoint roll gap;
after the operating in the normal operation, operating the plurality of roll stands in a calibration operation;
wherein during the calibration operation,
initially setting a calibrated actuator position of the actuator of the respective roll stand in such a way that the metal strip passes through the roll gap of the respective roll stand without being rolled by the work rolls;
then varying the calibrated actuator position until the work rolls roll the metal strip;
capturing a thickness of the metal strip by means of a thickness measuring device disposed downstream of the respective roll stand, the respective roll stand having a run out side, and the thickness of the metal strip being the thickness with which the metal strip runs out of the respective roll stand;
supplying the thickness of the metal strip, the further state parameters of the respective roll stand and the calibrated actuator position to the model, and the model establishing a new calibration value of the respective roll stand on the basis of the thickness, the further state parameters and the calibrated actuator position;
then transitioning from the calibration operation back to the normal operation and using the new calibration value, which was established in the calibration operation for establishing a new actuator position to be set.

2. The operating method as claimed in claim 1, further comprising
arranging at least one further roll stand between the respective roll stand and the thickness measuring device; and
setting an actuator position for each of further roll stands during the calibration operation of the respective roll stand such that the metal strip passes through the roll gaps of each of the further roll stands without the metal strip being rolled by the work rolls of further roll stands.

3. The operating method as claimed in claim 1, wherein the roll train has a driver disposed downstream of at least the respective roll stand; and
the method comprising applying a defined pull by the driver on the metal strip on the run-out side of the respective roll stand during the calibration operation of the respective roll stand.

4. The operating method as claimed in claim 3, further comprising arranging the driver downstream of a last one of the roll stands of the roll train.

5. The operating method as claimed in claim 1, wherein the roll train has a loop lifter disposed upstream of the respective roll stand; and
the method further comprising keeping the loop lifter at a defined elevation during the calibration operation.

6. The operating method as claimed in claim 1, further comprising
the roll train has a loop lifter disposed downstream of the respective roll stand; and
the method further comprising keeping the loop lifter at a defined elevation during the calibration operation.

7. The operating method as claimed in claim 1, further comprising
at least one other of the roll stands is disposed upstream of the respective roll stand; and
causing a pass sequence of the at least one of the other roll stands to remain unchanged from a moment at which the varying of the calibrated actuator position of the actuator of the respective roll stand starts until a moment of the transition from the calibrated operation to the normal operation of the respective roll stand.

8. The operating method as claimed in claim 7, further comprising
modifying the pass sequence of the respective roll stand and the at least one other roll stand after the moment of transition from the calibration operation to the normal operation of the respective roll stand.

9. The operating method as claimed in claim 1, further comprising arranging no further roll stand between the respective roll stand and the thickness measuring device.

10. A computer program product for a control device of a roll train having a plurality of roll stands for rolling a metal strip,
comprises a non-transitory storage medium and a computer program stored on the storage medium and the computer program comprises machine code, which when executed
causes the control device to operate the roll train according to an operating method as claimed in claim 1.

* * * * *